United States Patent
Blagsvedt et al.

(10) Patent No.: US 7,634,732 B1
(45) Date of Patent: Dec. 15, 2009

(54) PERSONA MENU

(75) Inventors: Sean Blagsvedt, Seattle, WA (US); Ilan Berker, Seattle, WA (US); Todd Blocksom, Issaquah, WA (US); Gabe Hall, Woodinville, WA (US); Chris White, Seattle, WA (US); Joseph Benoit, III, Seattle, WA (US); Karel Blaha, Renton, WA (US); Mitika Gupta, Kirkland, WA (US)

(73) Assignee: Microsoft Corporation, Redmond, CA (US)

( * ) Notice: Subject to any disclaimer, the term of this patent is extended or adjusted under 35 U.S.C. 154(b) by 729 days.

(21) Appl. No.: 10/606,578

(22) Filed: Jun. 26, 2003

(51) Int. Cl.
*G06F 3/00* (2006.01)

(52) U.S. Cl. .......................... 715/712; 715/751; 707/10

(58) Field of Classification Search .................. 715/751, 715/712, 714, 715; 707/10
See application file for complete search history.

(56) References Cited

U.S. PATENT DOCUMENTS

| | | | |
|---|---|---|---|
| 5,640,565 A | 6/1997 | Dickinson | |
| 5,859,636 A * | 1/1999 | Pandit | 715/204 |
| 5,950,193 A | 9/1999 | Kulkarni | 707/3 |
| 6,157,954 A | 12/2000 | Moon et al. | |
| 6,269,369 B1 | 7/2001 | Rogbertson | |
| 6,532,459 B1 | 3/2003 | Berson | 707/3 |
| 6,539,377 B1 | 3/2003 | Cullis | 707/5 |
| 6,553,037 B1 | 4/2003 | Pivowar et al. | 370/463 |
| 6,557,004 B1 | 4/2003 | Ben-Shachar et al. | 707/102 |
| 7,127,473 B2 * | 10/2006 | Agassi et al. | 707/103 R |
| 7,185,290 B2 | 2/2007 | Cadiz et al. | 715/838 |
| 2002/0065072 A1 | 5/2002 | Lindh | 455/422 |
| 2003/0007464 A1 * | 1/2003 | Balani | 370/310 |
| 2003/0069874 A1 | 4/2003 | Hertzog et al. | 707/1 |
| 2003/0078993 A1 | 4/2003 | Hull et al. | |
| 2003/0217328 A1 * | 11/2003 | Agassi et al. | 715/500 |
| 2004/0042599 A1 | 3/2004 | Zaner et al. | |
| 2004/0119761 A1 * | 6/2004 | Grossman et al. | 345/854 |
| 2005/0193335 A1 * | 9/2005 | Dorai et al. | 715/530 |
| 2007/0011148 A1 * | 1/2007 | Burkey et al. | 707/3 |

OTHER PUBLICATIONS

U.S. Appl. No. 10/324,246, filed Dec. 19, 2002, entitled "Contact Card", Inventors: Grossman et al.

(Continued)

*Primary Examiner*—Dennis Bonshock
(74) *Attorney, Agent, or Firm*—Merchant & Gould; Ryan T. Grace

(57) ABSTRACT

Methods and systems provide for aggregating person-centric data from one or more data sources and for providing the aggregated data to a user via a computer-displayed user interface that is keyed on or otherwise associated with an identified name in electronically presented text or data. A name in the text or data of an electronic document is identified and is associated with a unique identification, such as an electronic mail address. The unique identification is used by a persona menu application to obtain person-centric data from a variety of data sources. Example data sources include electronic mail contact files, electronic mail and calendaring system free/busy status files, directories of person-centric data related to persons associated with a distributed computing network, and instant messaging files. A data structure is populated with the returned data. Upon user selection, a user interface containing aggregated data associated with the identified name is displayed to the user to provide the user helpful information and actions associated with the identified name.

31 Claims, 4 Drawing Sheets

OTHER PUBLICATIONS

Anderson, T., *Change Your Outlook*, Developer Network Journal, No. 25, pp. 50-51, Jul.-Aug. 2001.

Taylor, T.C., *Databases Save Time and Customers*, Sales & Marketing Management, vol. 142, No. 4, pp. 105-107, Mar. 1990.

Kubota, K., Masuno, H., *Multi-Media Software PI*, NEC Technical Journal, vol. 41, No. 13, pp. 72-76, Nov. 1998.

Pettigrew, T., *ACT!—Automated Contact Tracking*, CA Magazine, vol. 95, No. 1022, pp. 48-49, Sep. 1991.

Simaioforidis, A., Karlgren, J., Ereback, A., *Research and Advanced Technology for Digital Libraries, Second European Conference, ECDL '98 Proceedings*, pp. 673-674, Sep. 21-23, 1998.

Heller, S.R., *Symantec ACT! 4.0 for Windows*, Journal of Chemical Information and Computer Sciences, vol. 28, No. 4, p. 772, Jul.-Aug. 1998.

U.S. Official Action dated Apr. 3, 2006 in U.S. Appl. No. 10/324,246.

* cited by examiner

PERSONA MENU

FIELD OF THE INVENTION

This invention relates to providing person-centric data and actions in a computer-generated user interface for review and use in association with an identified name in an electronic document.

BACKGROUND OF THE INVENTION

Since the advent of computers, software developers have strived to provide helpful contextual information to users of a variety of software applications. For example, software applications have been developed for recognizing that a user has entered a name in an electronic document and for providing helpful actions on the identified name. As users operate or have access to a number of different software applications, for example, word processors, spreadsheet applications, electronic mail and messaging applications, and the like, a variety of person-centric data is often maintained in association with a given user or name. For example, a contacts database may have a person's name, address, telephone number, email address, etc. When a user operates in an online session via a distributed computing network, an electronic mail server may be aware of the user's free/busy information in association with the user's electronic calendaring data. A messaging application may be aware of whether the user is currently online/offline, on the telephone, away from her computer, busy, etc. Other applications may keep track of other data such as a person's office number and personnel information, or the name and telephone number of the person's manager or employee. Unfortunately, prior systems do not allow users efficient and friendly access, if any, to the available person-centric data from a variety of data sources, such as those described above.

Accordingly, there is a need for a method and system for aggregating person-centric data from a variety of different data sources and for providing that data via a unified user interface upon the identification of a given person's name in an electronic document or page. It is with respect to these and other considerations that the present invention has been made.

SUMMARY OF THE INVENTION

Embodiments of the present invention provide methods and systems for aggregating person-centric data from one or more different data sources and for providing the aggregated data to a user via a computer-displayed user interface that is keyed on or otherwise associated with an identified name in electronically presented text or data.

According to one aspect, a name in the text or data of an electronic document, such as a word processor document, a spreadsheet document, a slide presentation document, an electronic mail document, or a variety of Internet-based web pages, is identified and is associated with unique identifying information. The unique identifying, such as the electronic mail address, an office number, telephone number, driver's license number, license plate number and the like, is used by a persona menu application to obtain person-centric data from a variety of data sources. Example data sources include electronic mail contact files, electronic mail and calendaring system free/busy status files, directories of person-centric data related to persons associated with a distributed computing network, and electronic messaging files. Additionally, one or more name-related actions may be called by the persona menu application for provision in association with the identified name. Person-centric data may include the name, address and telephone number of the identified name, the online/offline status of the identified name, calendaring information, such as free/busy calendaring status for the identified name, information on managers, colleagues or employees of the person associated with the identified name, or any other information related to the identified name that may be returned by one or more queried data sources.

As requested data is returned by the queried data sources to the persona menu application, a data structure is populated with the returned data. The identified name in the text or data of the electronic document is labeled to indicate to a user that some type of functionality is associated with the identified name. When the user subsequently focuses her mouse cursor on or otherwise selects the labeled name, an icon may be provided with which the user may launch a user interface containing aggregated data associated with the identified name. Alternatively, the user interface may launch automatically upon selection of or focus on the labeled name. According to one aspect of the invention, the user interface is dynamically populated with the person-centric data as the data is returned by the variety of data sources. The user may thus quickly and efficiently view a variety of helpful data associated with the identified name on the user's computer display in close proximity to the identified name.

According to another aspect of the invention, actions may be provided in association with the data presented in the user interface. For example, if the user selects a telephone number, the telephone number may be automatically dialed for the user. For another example, if the user selects an electronic mail address from the user interface, an instance of an electronic mail application may be launched for the user to email the selected address.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

As described briefly above, embodiments of the present invention are directed to methods and systems for aggregating person-centric data from one or more data sources and for providing the aggregated data to a user via a computer-displayed user interface that is keyed on or otherwise is associated with an identified name in electronically presented text or data. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is, therefore, not to be taken in a limiting sense and a scope of the present invention is defined by the appended claims and their equivalents.

Figure 1:
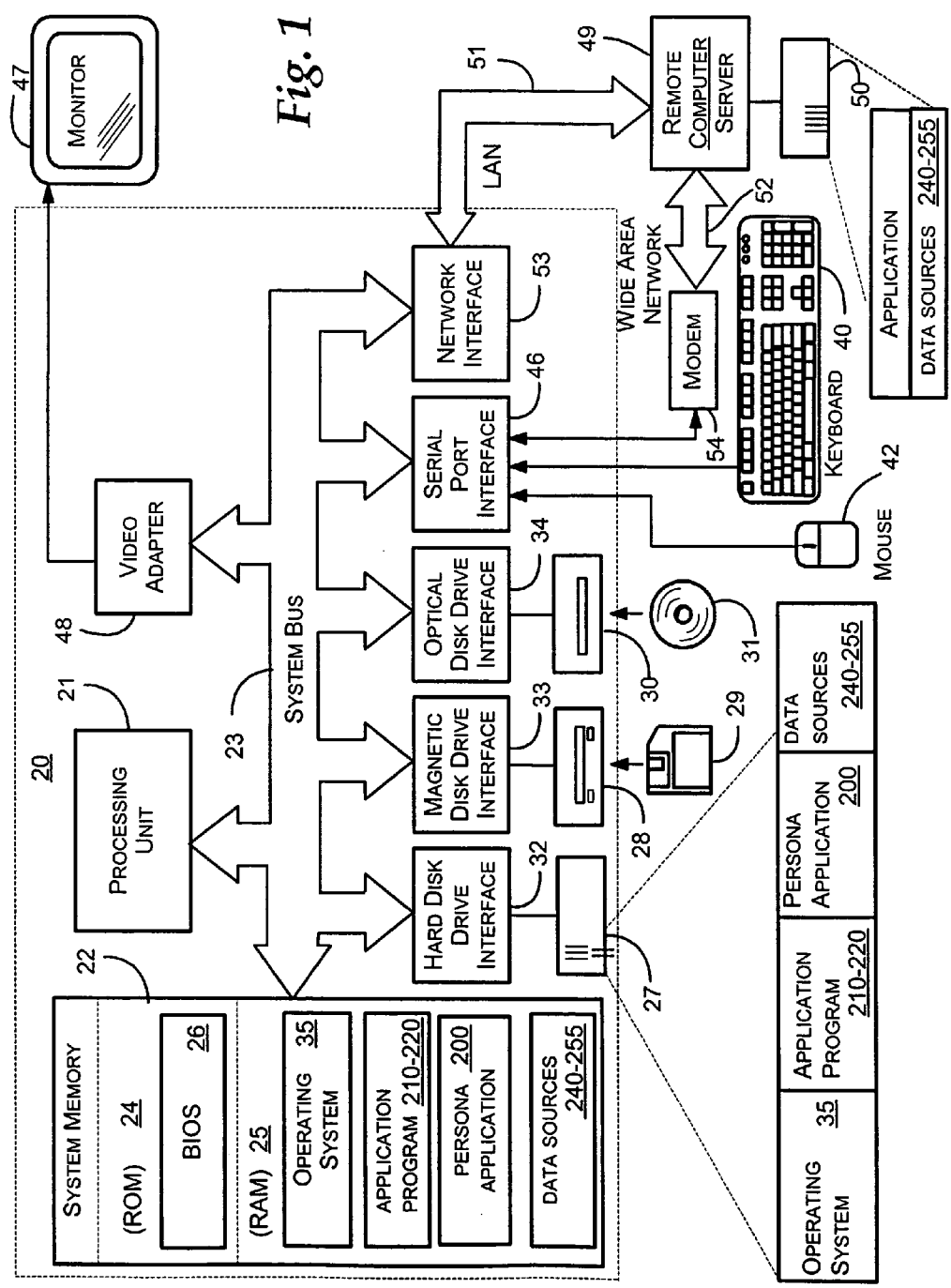
FIG. 1 is a block diagram showing the architecture of a personal computer that provides an illustrative operating environment for embodiments of the present invention.

Referring now to the drawings in which like numerals represent like elements throughout the several figures, aspects of the present invention and the exemplary operating environment will be described. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 210-220, a persona menu application 200. Also associated with the computer 20 either locally or remotely are data sources 240-255, described below.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
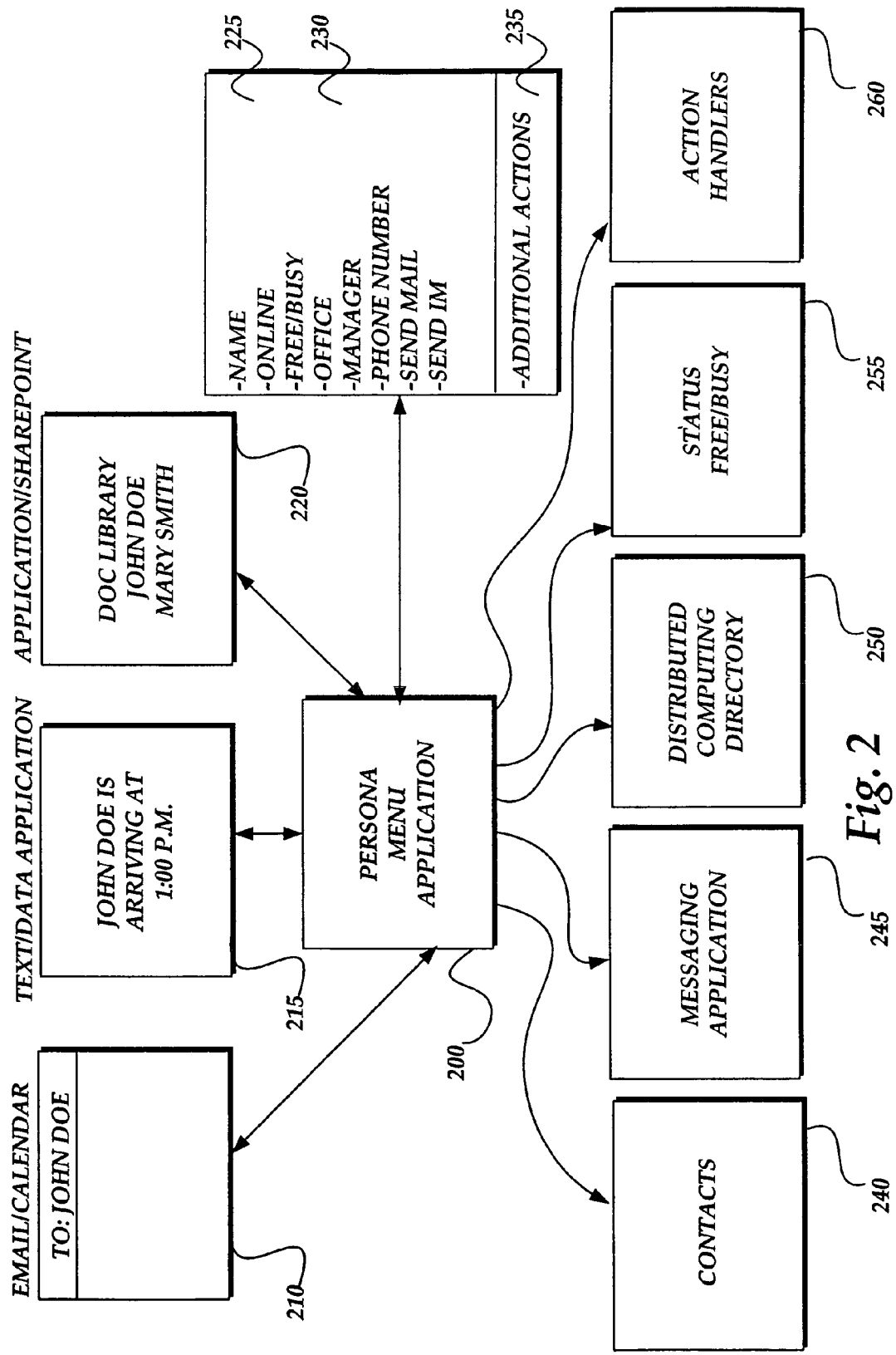
FIG. 2 is a simplified block diagram illustrating interaction of a persona menu application with a variety of software applications and with a variety of person-centric data sources.

FIG. 2 is a simplified block diagram illustrating interaction of a persona menu application with a variety of software applications and with a variety of person-centric data sources. According to embodiments of the present invention, a persona menu application 200 is operative to query a variety of different data sources 240, 245, 250, 255 for person-centric data associated with a person's name identified in a client side or Internet-based client operative application such as an electronic mail and calendaring application 210, a word processor, spreadsheet application, slide presentation application 215, or a variety of Internet-based web pages in which text and data may be rendered for client review and manipulation. As should be appreciated, a person name may be a name associated with a human person or associated with a company, school, venue and the like for which person-centric data, such as addresses, telephone numbers, electronic mail addresses and the like may be maintained.

The persona menu application is a software application module containing sufficient computer executable instructions for obtaining data from the data sources 240-255 and for aggregating the obtained data into a data structure 225 for presentation to a user of the client side applications 210, 215, 220 via a graphical user interface. According to one embodiment, the persona menu application is a dynamically-linked library which may be called upon by applications 210, 215, 220 for the functionality described herein. An exemplary dynamically-linked library (DLL) is the MSO.dll which forms a part of the Office® suite of applications manufactured by Microsoft Corporation of Redmond, Wash.

Referring still to FIG. 2, electronic mail and calendaring application 210 is a software application with which a user may send and receive electronic mail messages, maintain a variety of contacts information, etc. An exemplary electronic mail and calendaring application 210 is Outlooks manufactured by Microsoft Corporation of Redmond, Wash. The application 215 is illustrative of a word processor application with which a user may enter, manipulate, edit and print text or data. An exemplary word processor application is Word® manufactured by Microsoft Corporation of Redmond, Wash. The application 215 is also illustrative of a spreadsheet application with which a user may enter, edit and manipulate a variety of text and data. An exemplary spreadsheet application is Excel® manufactured by Microsoft Corporation of Redmond, Wash. Application 215 is also illustrative of a slide presentation application such as PowerPoint® manufactured by Microsoft Corporation of Redmond, Wash.

The application 220 is illustrative of an Internet browser such as Internet Explorer® manufactured by Microsoft Corporation of Redmond, Wash. with which a user may review a variety of Internet-based web pages whereby text and data may be rendered on a computer display in a variety of formats including hypertext markup language (HTML) format. The application 220 is also illustrative of a displayed Internet-based web page whereby shared or collaborative information may be shared among users through a distributed computing network such as the Internet. An exemplary shared information system through which users may share and collaborate on data via a distributed computing network includes Sharepoint® manufactured by Microsoft Corporation of Redmond, Wash.

As should be understood by those skilled in the art, the applications 210, 215 and 220 are not intended as an exhaustive list of applications that may operate in association with the persona menu application 200 according to the present invention. The applications 210, 215, 220 are for purposes of example only and are not restrictive of the invention as claimed. That is, any computer software application with which a user may enter and display text or data including names of persons, may utilize the functionality of the present invention where person-centric data and useful actions available for use with a name may be applied to any name contained in the text or data of such an application.

As briefly described above, the persona menu application 200 queries a variety of data sources 240-255 for person-centric data associated with a name identified in text or data rendered in an application 210, 215, 220. The contacts file 240 is illustrative of a database containing contacts information such as names, addresses, phone numbers, alternate electronic mail addresses, instant messaging addresses, and the like associated with a named person or entity, such as a company or other organization. The contacts 240 may be integrated with an electronic mail and calendaring application 210, described above, or the contacts file 240 may be maintained in a separate location such as a remote server 49 accessible by the persona menu application 200 via a distributed computing network. According to embodiments of the present invention, upon being queried by the persona menu application 200, the contacts file 240 may return the aforementioned contacts information on a name identified by the persona menu application.

The messaging application 245 is illustrative of an instant messaging system through which users may conduct instant messaging communications separate from conventional electronic mail messaging. An exemplary instant messaging system 245 is Messenger® manufactured by Microsoft Corporation of Redmond, Wash. According to embodiments of the present invention, the messaging application 245 maintains online status information on users who are registered to conduct instant messaging sessions through the messaging application 245. Online status information includes whether a particular named user is currently online, offline, busy, on a computer enabled telephone system, or whether the user is away from her computer and not currently registered with the messaging system 245. According to embodiments of the present invention, when queried by the persona menu application 200, the messaging application 245 may return the aforementioned online status information on a given named person.

The distributed computing environment directory server system 250 is illustrative of a directory system for maintaining person-centric data of a variety of persons and entities that communicate and collaborate via a distributed computing network. Such systems allow organizations and persons to manage and share information on network resources and users including managing a variety of sub-data directories maintained by various organizations such as companies, educational institutions, and the like. An exemplary distributed computing environment directory server system is Active® Directory manufactured by Microsoft Corporation of Redmond, Wash. According to embodiments of the present invention, the persona menu application 200 may query the directory system 250 to obtain such information as telephone numbers related to an identified person, employment information associated with an identified person such as supervisors, managers, colleagues and employees, and including office locations, telephone numbers, and addresses for each of these persons related to an identified named person.

The free/busy status data source 255 is illustrative of a data source containing information related to an identified person's calendaring data indicating whether a person is free or busy at a given time and indicating future free/busy information. An exemplary free/busy status data source is the Exchange® free/busy service available from Microsoft Corporation. Such systems 255 maintain a variety of electronic mail and calendaring information, particularly as found in distributed computing environments where a number of users may send, receive, and review calendaring information for themselves and for other users operating in the distributed computing network. According to embodiments of the present invention, the persona menu application 200 may query the free/busy status system 255 to obtain free/busy status information on an identified named person. For example, the persona menu application 200 may obtain the current free/busy status of a given identified name including free/busy information for the next eight hours. For example, for a given named person, for example "John Doe" information may returned by the free/busy status system 255 such as "John Doe is currently busy with an appointment and will be free as of 3:00 PM."

According to embodiments of the present invention, when a name is recognized in the text or data rendered in one of the applications 210, 215, 220, described above, unique identifying information for the name is passed to the persona menu application 200. The persona menu application 200 then passes the identifying information for the name to each of the data sources 240, 245, 250, 255 to obtain all available person-centric data, described above, related to or associated with the identified name. Each of the data sources 240-255 returns requested data to the persona menu application 200. As the persona menu application 200 receives data from the queried data sources, a data structure 225 is populated with the received data. The data structure 225 may be pre-populated with all names contained in a given user's personal or business contacts file 240. Accordingly, when a given user utilizes an application 210, 215, 220, a data structure 225 is pre-built and pre-populated with names that are at least available from the user's contacts file 240. The data structure may also be pre-populated with a variety of data properties 230 associated with data that may be received from the data sources 240-255. Data properties include online status, free/busy status, office location, manager, employee, colleague identification, and telephone numbers. Additionally, helpful actions such as send mail or send instant messages may also be provided, as will be described below.

As briefly described above, the persona menu application 200 queries the data sources 240-255 using the unique identifying information associated with a name identified in text or data displayed or rendered by one of the client-side applications 210, 215, 220. Unique identifying information may include any data associated with a name that may be used by the persona menu application to query the different data sources for person-centric information associated with the identified name. For example, unique identifying information may include an electronic mail address, a telephone number, an office number and address, an alphanumeric identification, such as a social security number, a home address, a drivers license number, a license plate identification, and the like. It should be appreciated that this listing of types of identifying information is not to be taken in a limiting sense but merely provides examples of many types of unique identifying information that may be utilized to distinguish one person name from another for obtaining person-centric information associated with a particular name. According to one embodiment of the present invention, an exemplary unique identification is an electronic mail address associated with an identified name.

Referring to the electronic mail and calendaring application 210, because electronic mail applications typically contain a "to", "from", "cc", "bcc" fields for sending mail, electronic mail addresses may be readily obtained for persons to which electronic mail is being sent. Likewise, electronic mail received via the application 210 typically identifies the electronic mail addresses of the sending parties including parties who have been copied on sent and received electronic mail. The persona menu application 200 is operative to parse the electronic mail address fields of the application 210 and the mail receipt and the display frame of the application 210 for electronic mail addresses. Electronic mail addresses located by the persona menu application 200 may be passed to the data sources 240, 245, 250, 255 as a unique identification for a person associated with each of the electronic mail addresses for obtaining person-centric data for that person. Other unique identifying information, as outlined above, may likewise be identified in an electronic mail and calendaring application 210 for passing to the different data sources.

Turning now to the web page application 220, as should be appreciated by those skilled in the art, text and data displayed via an Internet-based web page application 220 is typically displayed via HTML as a markup language for rendering text or data in an Internet-based web page display. According to embodiments of the present invention, when a web page display application 220 renders text or data in HTML format, certain person-centric data associated with names may be tracked by the application 220 as the text or data is being rendered. For example, unique identifying information, such as an electronic mail address, associated with a person name to be rendered in HTML format may be hidden from display, but otherwise known by the application 220 responsible for rendering the text or data. That is, various data attributes associated with unique identifying information as outlined above, such as an electronic mail address, may be associated with a text item such as a name to be rendered in HTML format, but such data attributes may not themselves be rendered for display in the web page. Such data attributes associated with a name may be extracted by the persona menu application 200 for use as a unique identification for the associated name in order to obtain person-centric data for the identified name from the data sources 240-255.

When text or data is entered into an application 215, as described above, a recognition application may be used for recognizing strings of text within a given text or data selection as a name. According to one embodiment, as text is entered into an electronic document according to the application 215, selected portions of text, such as words, sentences, paragraphs, pages, are sent to a recognizer dynamically-linked library where the text selection is broken into identifiable words. The identifiable words are then compared against a database of words in order to recognize the words and provide a label according to the data type of a given recognized word. According to embodiments of the present invention, words from a text or data selection entered via the application 215 are compared against a database of names, such as the contacts file 240, to determine whether any of the words contained in the text selection are recognized as a name. For example, as shown in FIG. 2, the text "John Doe is arriving at 1:00 PM" has been entered into an electronic document via the application 215. The text selection may be sent to the recognizer DLL which may in turn compare words of the text selection against a contacts file 240. If the contacts file 240 has an entry for "John Doe," the words "John Doe" in the text selection may be identified as a name. For additional information on recognition of text and data from a selected text or data string, see U.S. patent application Ser. No. 09/588,411, entitled "Method and System for Semantically Labeling Strings and Providing Actions Based on Semantically Labeled Strings," and U.S. patent application Ser. No. 10/426,446, entitled "Methods and Systems for Recognizing Names in a Computer-Generated Document and for Providing Helpful Actions Associated with Recognized Names," both applications of which are expressly incorporated herein by reference as if fully set out herein. As should be appreciated, if any other unique identifying information, such as an electronic mail address, is entered and rendered in association with an identified name in an electronic document via the application 215, the recognition process, described above, may not be necessary. That is, the other unique identifying information entered via the application 215, may be utilized by the persona application menu 200 for querying the data sources 240-255.

In the case of a name recognized from text or data entered via the application 215, the persona menu application 200 may utilize the name to query a contacts database or file 240 in order to obtain an electronic mail address for the name. If more than one name is located in the contacts file 240 that matches the name passed by the persona menu application 200, resolution of the name as associated with a particular name in the contacts file 240 may be performed by obtaining other information from the document entered via the application 215, such as an address, a telephone number, and the like that may be utilized to isolate a particular name in the contacts file 240. If a name is located in the contacts file 240 matching the name passed from the persona menu application 200, unique identifying information contained in the contacts file for the name may thus be used by the persona menu application 200 for querying each of the data sources 240-255 for person-centric data, as described herein.

In the case of any of the applications 210, 215, 220 where the unique identifying information associated with the name, for example an electronic mail address, does not net requested data from the data sources 240-255, the persona menu application 200 may send the unique identifying information to the contacts database 240 to determine whether the unique identifying information obtained by the persona menu application 200 may be resolved to a different identifying information for the same named person. For example, if an electronic mail address obtained by the persona menu application is a secondary electronic mail address such as a personal electronic mail address or instant messaging mail address, the persona menu application 200 may utilize the secondary electronic mail address to parse the data contained in the contacts database 240 to locate a primary electronic mail address for the identified named person. For example, if an electronic mail address for "John Doe" is obtained from the application 210 as "JohnDoe@instantmessaging.com," that electronic mail address may not be located in the data sources 240-250 for obtaining person-centric information for the name "John Doe." Accordingly, the persona menu application 200 may parse the contacts database 240 with the email address to determine whether a primary email address, such as a corporate email address is available for the same person, "John Doe," as the instant messaging mail address. That is, "John Doe" may have a contact file in the contacts file 240 wherein a number of electronic mail addresses is included including the instant messaging address obtained from the application 210, 215, 220. The persona menu application 200 may utilize the obtained instant messaging address to locate an alternate or primary electronic mail address such as a corporate email address. Once the persona menu application has resolved the electronic mail address, as described, the alternative electronic mail address may be utilized by the persona menu application 200 for querying the data sources 240-255 for person-centric information, as described above.

Referring still to FIG. 2, an action handlers application 260 is illustrated. According to embodiments of the present invention, in addition to the person-centric information provided to the persona menu application 200 for population of the data structure 225, a number helpful name-oriented actions may be provided for operation and association with an identified name. As shown in the data structure 225, an additional actions field 235 is provided for providing links to the action handlers 260 for providing actions on identified and labeled names. Accordingly, as will be described below, when a name is identified and labeled in an application 210, 215, 220, in addition to receiving useful person-centric information 230 illustrated in the data structure 225, actions such as "open a contacts file," "send mail," "create a meeting," and the like may be provided for use in association with the identified name.

Figure 3:
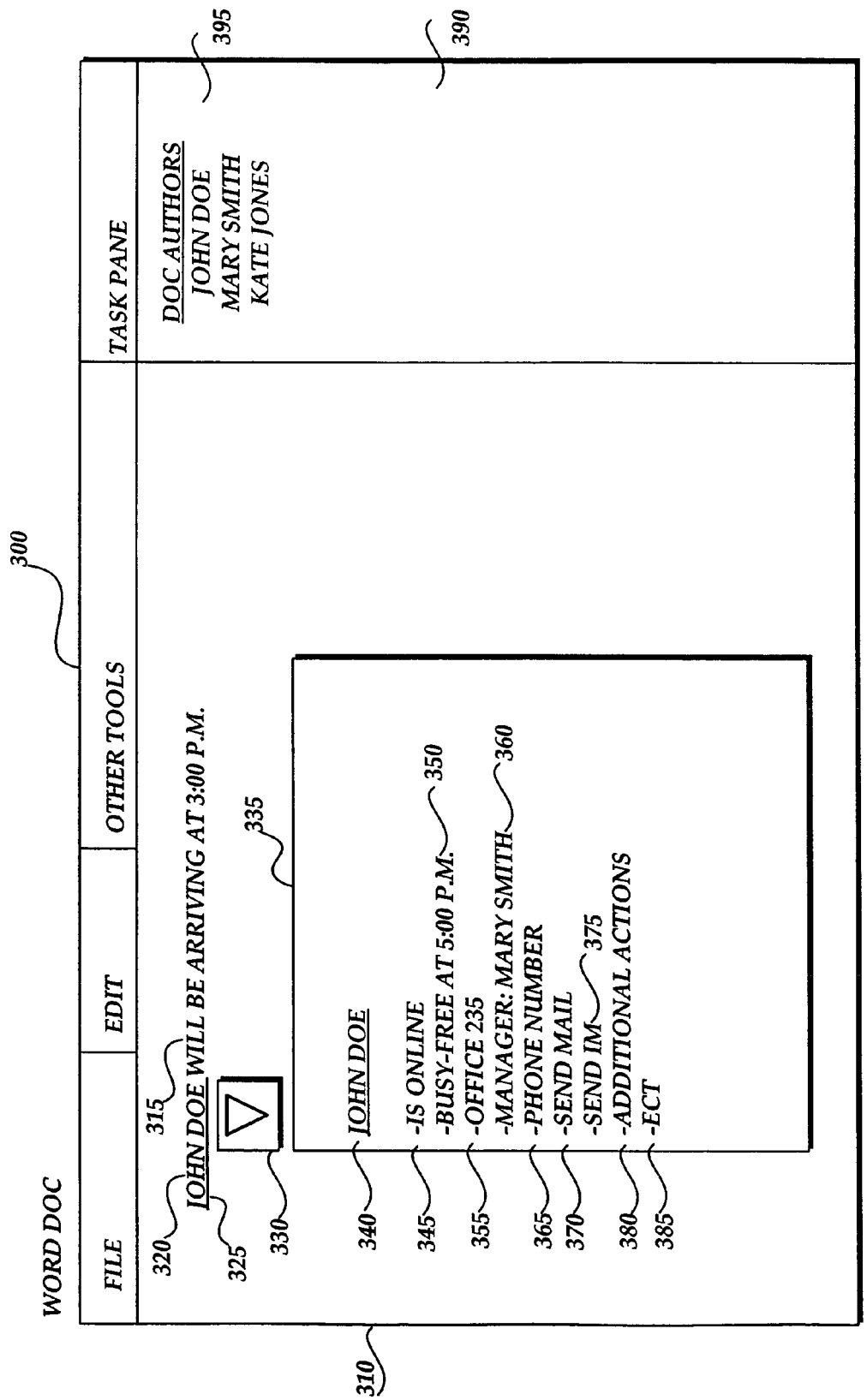
FIG. 3 illustrates a computer screen display showing an illustrative user interface for providing person-centric data in association with a labeled name in a given text selection.

FIG. 3 illustrates a computer screen display showing an illustrative user interface for providing person-centric data in association with a labeled name in a given text selection. The word processor application display 300 is illustrative of a display from any of the applications 210, 215, 220 in which text or data may be entered and rendered containing names for which person-centric information may be obtained in accordance with embodiments of the present invention. A text string 315 "John Doe will be arriving at 3:00 PM" is illustrated as a text string entered by a user of the word processing application 215. According to an embodiment of the present invention, the text string 315 may have been entered into the workspace 310 of the display 300, or the text string 315 may have been imported into the workspace 310 by selection of a document from a local or remote storage area. For example, documents may be maintained in a remote collaborative document library that is accessible via a web page 220, illustrated in FIG. 2. Selection of a document from the document library may cause the document to be presented in the workspace 310 of the word processing display 300.

A task pane 390 is illustrated in FIG. 3 showing information on a document downloaded, as described, and including information on authors or other collaborative participants 395 in the document creation. According to embodiments of the present invention, any name contained in the work area 310 or other displayed user interfaces such as the task pane 390 may be recognized as a name for providing the person-centric information and helpful actions, as described herein. Likewise, as described above, the person-centric information and helpful actions described herein may be provided for any name recognized in the user interfaces and text and data display areas of any of the applications 210, 215, 220.

Referring still to FIG. 3, according to embodiments of the present invention, when a text selection such as the text "John Doe will be arriving at 3:00 PM," is entered into the document workspace 310, or when some other unique identifying information associated with a name, such as an electronic mail address, is entered or received via the application 210, the identifying information for the name is forwarded to the persona menu application 200, as described above with reference to FIG. 2. The persona menu application then queries the data source 240-255 for person-centric data associated with the identified name.

Once the persona menu application 200 begins receiving requested data from the data sources 240-255, the name associated with the unique identifying information, or the name itself in the case of documents created via the application 215 is labeled with a label 325 as illustrated in FIG. 3. According to one embodiment of the present invention, the label 325 may be an underline positioned underneath the name or electronic mail address, a dotted line, or any other visual indication that the labeled name is associated with some additional functionality. When the name is first labeled, as described, the icon 330 and the user interface 335 are hidden from view. When the user of the document 300 selects the labeled name such as by clicking on the labeled name or by focusing a mouse cursor on the labeled name, an icon 330 is presented to the user. Selection of the icon 330 causes the user interface 335 to drop on to the work area 310 in close proximity to the labeled name. According to embodiments of the present invention, the user interface 335 dynamically presents data being populated into the data structure 225 by the persona menu application 200. That is, when the user selects the icon 330 to deploy the user interface 335, all data associated with data properties 230 of the data structure 225 may not have been received by the persona menu 200 for population into the data structure 225. The user interface 335 may contain data place markers associated with each of the data properties 230. As data is received by the persona menu 200 and populated into the data structure 225, the user interface 335 dynamically is populated with data associated with the data properties 230.

Referring to the user interface 335, a name 340 is populated into the user interface 335. Data 345 is populated for the online/offline data property 230. Other data including the free/busy data 350, the office location 355, the person's manager 360, the telephone number 365, and actions such as the "send mail" action 370, the "send instant messaging" action 375 and additional actions 380 are displayed in the user interface 335. Accordingly, a user of the document 300 may quickly and efficiently obtain helpful person-centric information on the subject name, for example "John Doe," illustrated in FIG. 3.

According to embodiments of the present invention, information displayed in the user interface 335, as illustrated in FIG. 3, may also serve as links to actions associated with the displayed information. For example, selection of the phone numbers 365 may call the data object model of an instant messaging application 245 to allow the user to automatically dial telephone numbers contained under the telephone number information 365. Selection of the "send mail" action 370 may launch an instance of the user's electronic mail application 210 pre-populated with an electronic mail address associated with the identified and labeled name in order to automatically send electronic mail messages to the identified name. Selection of the manager or other persons data 360 may allow the user to obtain additional information including an additional user interface 335 for person-centric data on one or more persons identified in the entry 360. Selection of the free/busy information 350 may launch a scheduling dialog from the user's electronic mail and calendaring application 210 to allow the user to review detailed information associated with the identified person's calendar data for a period of time such as eight hours.

The additional actions line 380 may be selected by the user to access name-centric actions not particularly oriented to the identified name, but that may be utilized with respect to any named person. Such actions include "send email," "add to contacts," "create a meeting," and the like. As should be understood by those skilled in the art, the information illustrated in the user interface 335, is not an exhaustive list of the types and kinds of person-centric information and other name-centric actions that may be obtained by the persona menu application 200 and displayed to the user via the user interface 335. That is, any information that may be of interest to a user in association with an identified name that may be obtained by the functionality of the persona menu application 200 may be displayed in the user interface 335.

Figure 4:
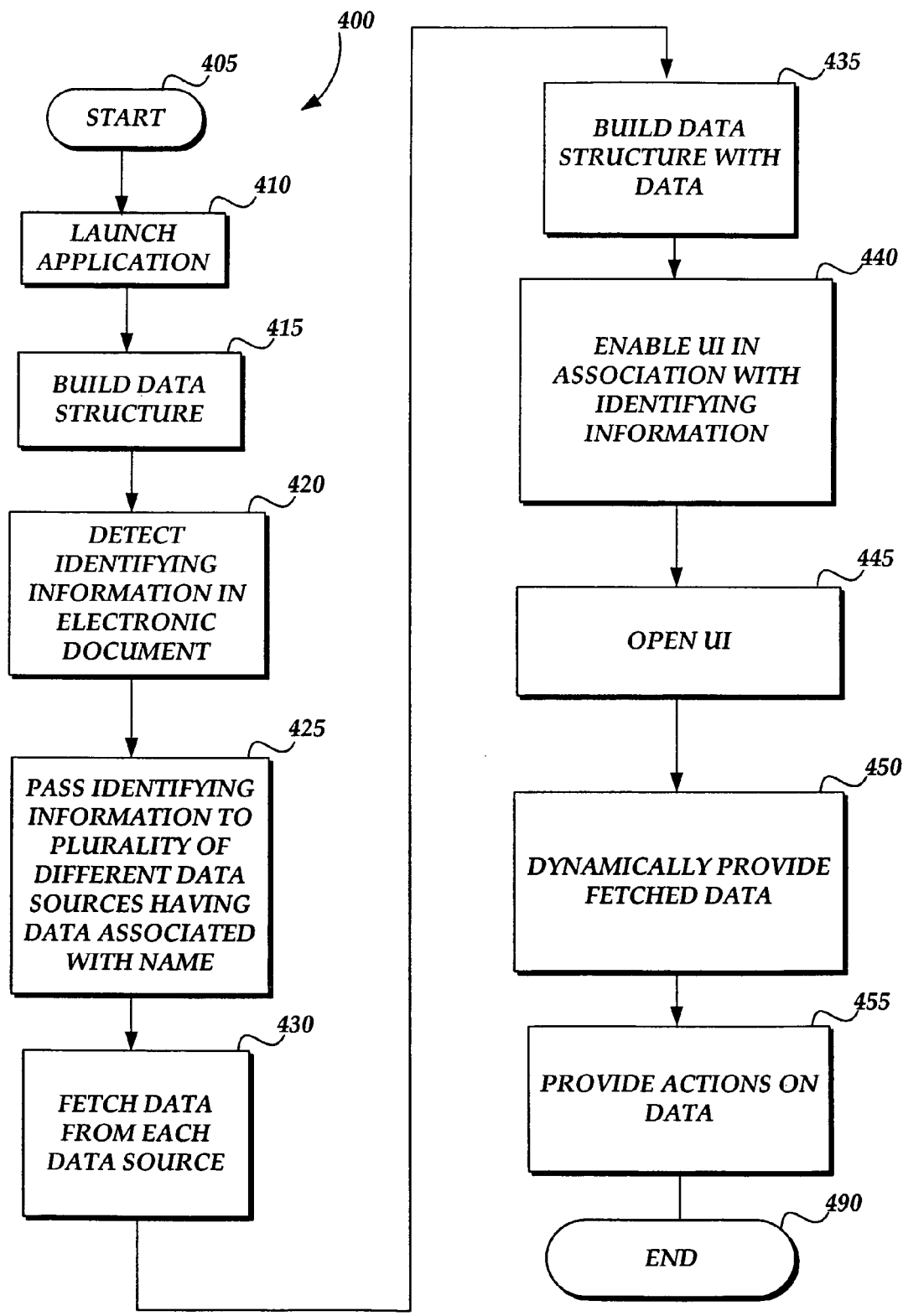
FIG. 4 is a flow diagram illustrating a routine for aggregating person-centric data from a variety of data sources and for presenting the aggregated data in a user interface in association with an identified and labeled name.

FIG. 4 is a flow diagram illustrating a routine for aggregating person-centric data from a variety of data sources and for presenting the aggregated data in a user interface in association with an identified and labeled name. The method 400 begins at start block 405 and proceeds to block 410 where a user launches an application 210, 215, 220 for conducting an electronic mail communications session, entering and editing text or data, or reviewing rendered text or data via a web page rendered by the application 220. At block 415, the persona menu application 200 may pre-build a data structure 225 for all names contained in the user's personal or business contacts file 240 in anticipation of needing data structures for each such name as the user sends and receives electronic mail messages to various named persons and enters and edits names in text rendered in the applications 215, 220.

At block 420, the persona menu application 200 detects unique identifying information associated with a name or detects a name in an electronic document created via the applications 210, 215, 220. As described above, if the persona menu application 200 only detects a name (without unique identifying information) entered into a document created by an application 215, the name may be passed to a recognizer DLL for recognizing the associated text entry as a name. Once the associated text entry is recognized as a name, the text corresponding to the name may be utilized by the persona menu application 200 for parsing a contacts database 240 for determining whether an electronic mail address is associated with the identified name.

At block 425, the persona menu application 200 utilizes the unique identifying information, such as an electronic mail address, obtained or resolved from data obtained from the applications 210, 215, 220 to query one or more data sources 240-255 for person-centric data associated with the identified name. At block 430, person-centric data from each queried data source is fetched by the persona menu application 200. At block 435, as requested data from the data sources 240-255 is received by the persona menu application 200, the data structure 225 is populated whereby data associated with data properties 230 is populated into the data structure 225. Likewise, at this time, any available actions from action handlers 260 are obtained by the persona menu application for general application to names. Links to the action handlers 260 are populated into the additional actions field 235 of the data structure 225.

At block 440, the user interfaces 325, 330, 335 are enabled by the persona menu application 200 in association with the name or unique identifying information. As described above with reference to FIG. 3, a visual indication 335 is applied to the name or electronic mail address in the electronic document displayed via the applications 210, 215, 220 for subsequent selection or focus by a user. Upon selection or focus of the visual indication 325, the icon user interface 330 is displayed. At block 445, if the icon 330 is selected, the user interface 335 is opened.

At block 450, the user interface 335 dynamically is populated with fetched data from the data structure 225 as the data is populated into the data structure 225. That is, when the user interface 335 is first opened, all data items illustrated in FIG. 3 may not be displayed in the user interface 335. However, as data associated with place markers in the user interface 335 is populated into the data structure 225 from the data sources 240-255, the user interface 335 is updated to reflect the additional data. At block 455, additional actions 380 may be provided in the user interface 335 to allow the user to select name-centric actions, as described above. Once the user interface 335 is drawn, as described above with reference to FIG. 3, the user may review the information, or may select certain information entries to launch additional functionality associated with those entries, as described above with reference to FIG. 3. The method ends at block 490.

Advantageously, person-centric information and helpful actions may be provided via a user interface that may be displayed in close proximity to an identified name or other identifying information associated with a name. The user interface may be displayed for use in association with any name displayed or otherwise rendered by a variety of software applications in which text or data may be displayed or rendered. Accordingly, the user of the functionality of the present invention may quickly and readily obtain helpful person-centric information related to an identified name and helpful actions that may be utilized with respect to an identified name. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for aggregating person-centric information for displaying in a user interface, comprising:

accessing a client-side application of the client device to obtain a client manipulative electronic document on the client side application;

parsing the text of the electronic document, by a persona menu application located on the client device, for a person name, wherein the persona menu application is separate from the client-side application and is configured as a dynamically linked library for accessing a plurality of different data sources related to a suite of applications;

querying, by the persona menu application, at least one user contact data source of the plurality of different data sources containing person-centric data to identify person-centric data associated with the person name;

obtaining, at the persona menu application, person-centric data associated with the person name from the at least one user contact data source;

querying, by the persona menu application, at least one subsequent data source of the plurality of different data sources containing person-centric data to identify additional person-centric data based on the person name and the person-centric data obtained from the query of the at least one user contact data source;

obtaining, at the persona menu application, the additional person-centric data from the at least one subsequent data source, wherein a communication application for communicating with a user identified by the person name is associated with at least one member of a group comprising: the at least one user contact data source and the at least one subsequent data source;

populating, in the client-side application of the client, a data structure for the person name with the person-centric data obtained from the at least one user contact data source and the at least one subsequent data source; and providing a graphical user interface, of the separate persona menu application, in the client-side application of the client device, wherein the graphical user interface displays the person-centric data and the additional person-centric data adjacent to the person name in the electronic document of the client-side application, wherein the graphical user interface of the separate persona menu application includes action items for facilitating communication with the user identified by the person name according to the communication application associated with the at least one member of a group comprising: the at least one user contact data source and the at least one subsequent data source.

2. The method of claim 1, whereby parsing an electronic document for a person name includes obtaining unique identifying information associated with the person name.

3. The method of claim 2, whereby obtaining unique identifying information associated with the person name includes obtaining data associated with the person name for identifying the person name.

4. The method of claim 3, whereby obtaining unique identifying information associated with the person name includes obtaining an electronic mail address for the person name.

5. The method of claim 1, prior to populating a data structure for the person name with the person-centric data, building a data structure having data properties corresponding to person-centric data obtainable from the at least one user contact data source.

6. The method of claim 1, prior to providing a graphical user interface for displaying the person-centric data, labeling the person name in the electronic document to indicate available functionality.

7. The method of claim 6, further comprising providing an icon in the electronic document adjacent to the person name for selectively displaying the graphical user interface.

8. The method of claim 1, whereby the person-centric data includes online/offline status for the person name.

9. The method of claim 1, whereby the person-centric data includes free/busy status information for the person name.

10. The method of claim 1, whereby the person-centric data includes office location information for the person name.

11. The method of claim 1, whereby the person-centric data includes telephone numbers for the person name.

12. The method of claim 1, whereby the person-centric data includes information related to additional person names associated with the person name.

13. The method of claim 1, whereby at least one subsequent data source includes a contacts database.

14. The method of claim 1, whereby the at least one subsequent data source includes an instant messaging database.

15. The method of claim 1, whereby the at least one subsequent data source includes a distributed computing environment directory services database.

16. The method of claim 1, whereby the at least one subsequent data source includes a free/busy status database.

17. A computer readable storage medium containing computer readable instructions which when executed by a computer perform a method for aggregating person-centric information for displaying in a user interface, comprising:

accessing a client-side application of the client device to obtain a client manipulative electronic document on the client-side application;

parsing the text of the electronic document, by a persona menu application located on the client device, for an electronic mail address associated with a person name, wherein the persona menu application is separate from the client-side application and is configured as a dynamically linked library for accessing a plurality of different data sources related to a suite of applications;

querying, by the persona menu application, at least one user contact data source of the plurality of different data sources containing person-centric data to identify person-centric data associated with the electronic mail address;

obtaining, at the persona menu application, person-centric data associated with the person name from the at least one user contact data source;

querying, by the persona menu application, at least one subsequent data source of the plurality of different data sources containing person-centric data to identify additional person-centric data based on the person name and the person-centric data obtained from the query of the at least one user contact data source;

obtaining, at the persona menu application, the additional person-centric data associated with the person name from the at least one subsequent data source, wherein a communication application for communicating with a user identified by the person name is associated with at least one member of a group comprising: the at least one user contact data source and the at least one subsequent data source;

populating, in the client-side application of the client device, a data structure for the person name with the person-centric data obtained from the at least one user contact data source and the at least one subsequent data source;

labeling the person name in the electronic document to indicate available functionality;

upon user selection of the labeled person name, providing a graphical user interface, of the separate persona menu application, in the client-side application of the client device, wherein the graphical user interface displays the person-centric data and the additional person-centric data adjacent to the person name in the electronic document of the client-side application, wherein the graphical user interface of the separate persona menu application includes action items for facilitating communication with the user identified by the person name according to the communication application associated with the at least one member of a group comprising: the at least one user contact data source and the at least one subsequent data source.

18. The computer readable storage medium of claim 17, prior to populating a data structure for the person name with the person-centric data, building a data structure having data properties corresponding to person-centric data obtainable from the at least one user contact data source.

19. The computer readable storage medium of claim 17, further comprising providing an icon in the electronic document adjacent to the person name for selectively displaying the graphical user interface.

20. The computer readable storage medium of claim 17, whereby the person-centric data includes online/offline status for the person name.

21. A system for aggregating person-centric information for displaying in a user interface, comprising:
   a processor; and
   a memory having computer executable instructions stored thereon, the computer executable instructions being configured for:
      accessing a client-side application of the client device to obtain a client manipulative electronic document on the client side application;
      parsing the text of the electronic document, by a persona menu application, for a person name, wherein the persona menu application is separate from the client-side application and is configured as a dynamically linked library for accessing a plurality of different data sources related to a suite of applications;
      querying, by the persona menu application, at least one user contact data source of the plurality of different data sources containing person-centric data to identify person-centric data associated with the person name;
      obtaining, at the persona menu application, person-centric data associated with the person name from the at least one user contact data source;
      querying, by the persona menu application, at least one subsequent data source of the plurality of different data sources containing person-centric data to identify additional person-centric data based on the person name and the person-centric data obtained from the query of the at least one user contact data source;
      obtaining, at the persona menu application, the additional person-centric data from the at least one subsequent data source, wherein a communication application for communicating with a user identified by the person name is associated with at least one member of a group comprising: the at least one user contact data source and the at least one subsequent data source;
      populating, in the client-side application of the client, a data structure for the person name with the person-centric data obtained from the at least one user contact data source and the at least one subsequent data source; and
      providing a graphical user interface, of the separate persona menu application, in the client-side application of the client device, wherein the graphical user interface displays the person-centric data and the additional person-centric data adjacent to the person name in the electronic document of the client-side application, wherein the graphical user interface of the separate persona menu application includes action items for facilitating communication with the user identified by the person name according to the communication application associated with the at least one member of a group comprising: the at least one user contact data source and the at least one subsequent data source.

22. The system of claim 21, the persona menu application being further operative to provide an icon in the electronic document adjacent to the person name for selectively displaying the graphical user interface.

23. The system of claim 21, whereby the person-centric data includes online/offline status for the person name.

24. The system of claim 21, whereby the person-centric data includes free/busy status information for the person name.

25. The system of claim 21, whereby the person-centric data includes office location information for the person name.

26. The system of claim 21, whereby the person-centric data includes telephone numbers for the person name.

27. The system of claim 21, whereby the person-centric data includes information related to additional person names associated with the person name.

28. The system of claim 21, whereby the at least one subsequent data source includes a contacts database.

29. The system of claim 21, whereby the at least one subsequent data source includes an instant messaging database.

30. The system of claim 21, whereby the at least one subsequent data source includes a distributed computing environment directory services database.

31. The system of claim 21, whereby the at least one subsequent data source includes a free/busy status database.

* * * * *